United States Patent [19]
Falk

[11] 3,942,628
[45] Mar. 9, 1976

[54] TABLE FEEDER
[75] Inventor: Alfons O. Falk, Smedjebacken, Sweden
[73] Assignee: Morgardshammar Aktiebolag, Smedjebacken, Sweden
[22] Filed: Nov. 8, 1973
[21] Appl. No.: 413,791

[30] Foreign Application Priority Data
Nov. 10, 1972 Sweden............................ 14623/72
Mar. 9, 1973 Sweden.............................. 7303338

[52] U.S. Cl............ 198/220 DA; 209/327; 209/329; 209/365 A
[51] Int. Cl.².......................................... B65G 27/00
[58] Field of Search........ 209/325, 327, 329, 365 R, 209/365 A, 446, 462; 198/220 DA, 220 A

[56] References Cited
UNITED STATES PATENTS
| | | | |
|---|---|---|---|
| 604,061 | 5/1898 | Mendenhall | 209/446 X |
| 1,170,077 | 2/1916 | Lawry | 198/220 DA |
| 3,250,380 | 5/1966 | Allen et al. | 198/220 DA |
| 3,265,196 | 8/1966 | Allen et al. | 198/220 DA |

Primary Examiner—Evon C. Blunk
Assistant Examiner—Douglas D. Watts

[57] ABSTRACT
An improved table feeder type material handling apparatus includes a support table or tray which is moved through forward and return strokes by a drive assembly to convey ore or other material disposed on the tray in a forward direction relative to the tray. In accordance with a feature of the present invention, the stroke or distance through which the tray is moved can be varied while maintaining the stroke rate substantially constant. To provide this capability, the drive assembly includes a rotatable input member which is connected with the support tray by a linkage. A connection between the linkage and the input member is offset relative to the axis of rotation of the input member. Therefore, when the input member is rotated about its central axis, one end of the linkage is moved along a circular path. The stroke distance through which the support tray is moved is adjusted by varying the angular relationship between the central axis of the input member and the path of movement of the support tray to thereby move diametrically opposite portions of the circular path relative to the path of movement of the support tray. A screening table or tray receives material from the support tray. The screening tray moves through forward and return strokes with the support tray. In addition, the drive assembly is effective to move the screening tray through up and down strokes to promote the movement of small particles of ore through openings in the screening tray.

18 Claims, 9 Drawing Figures

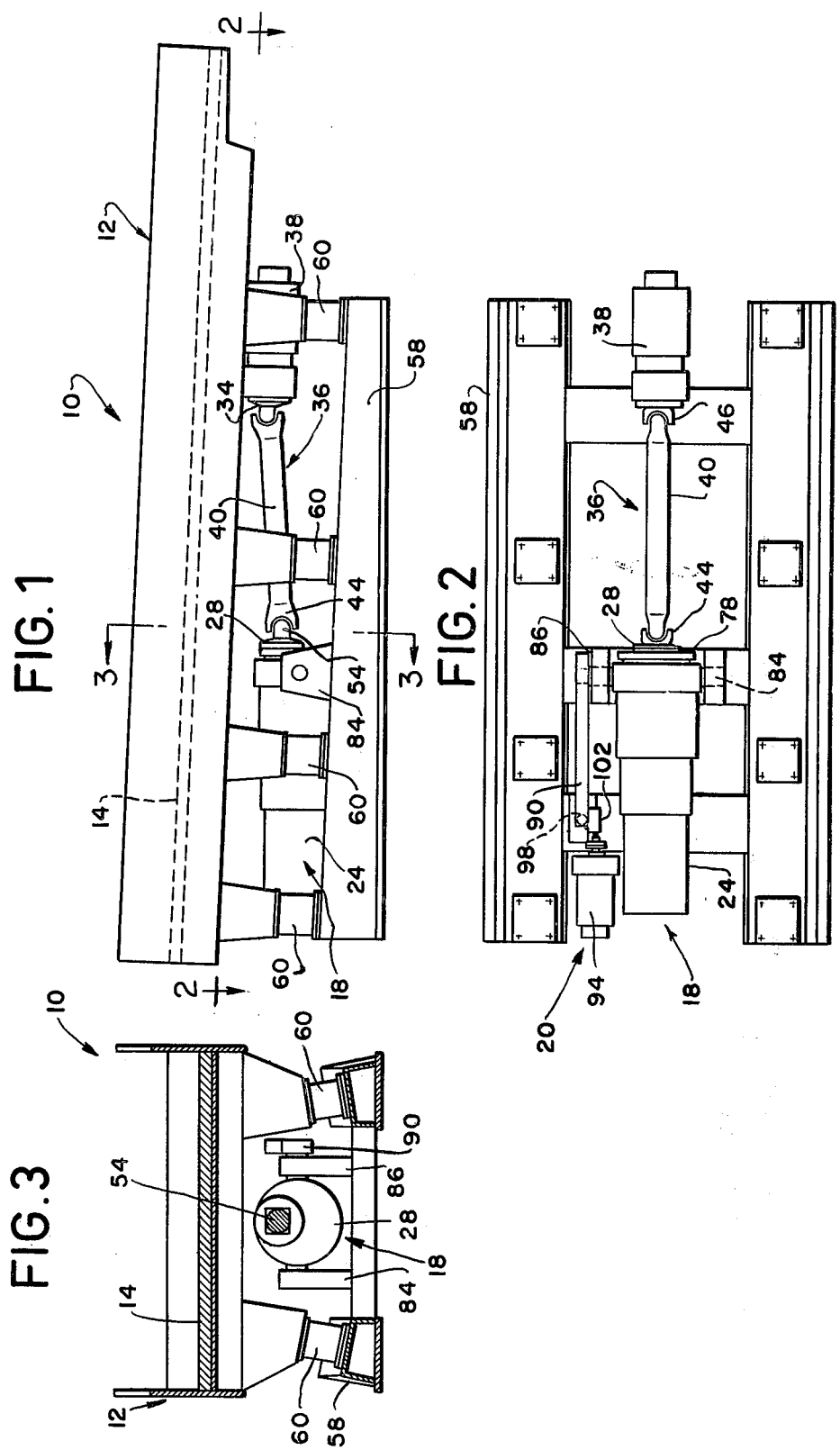

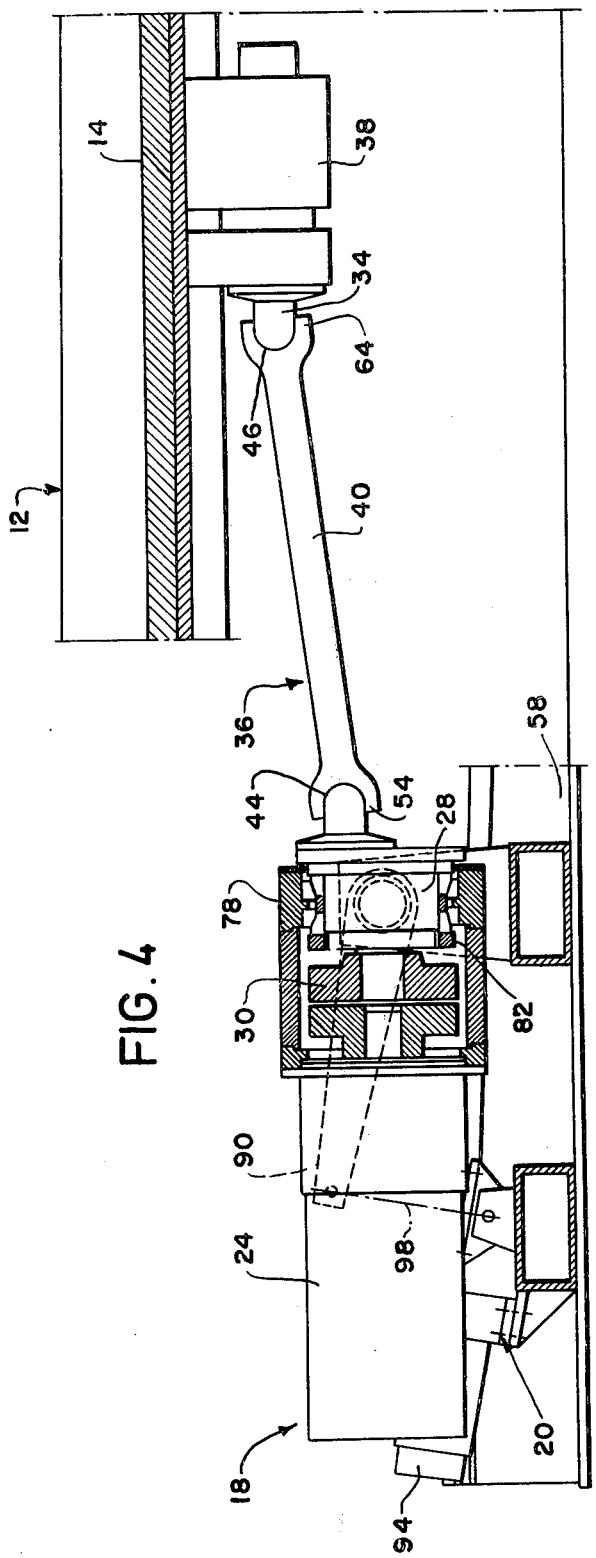
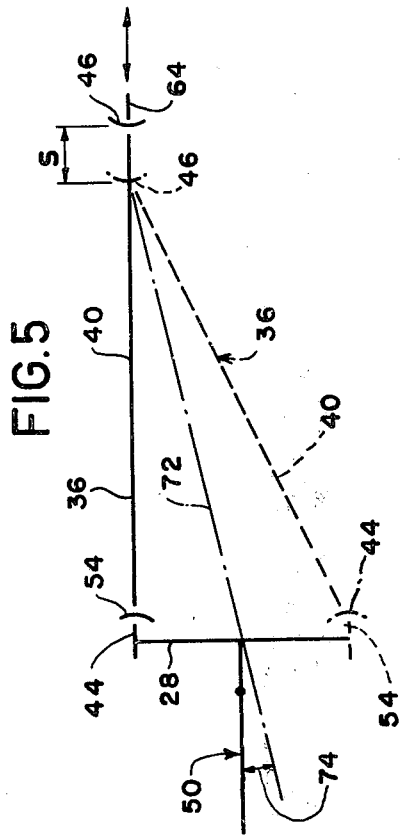

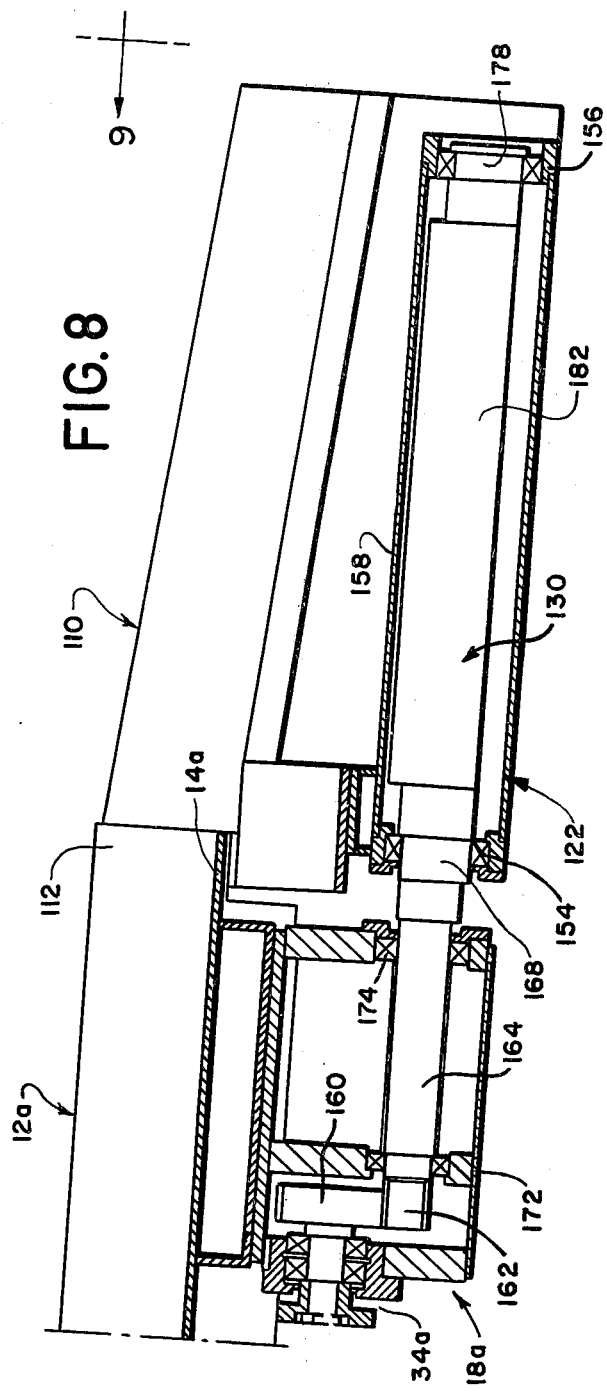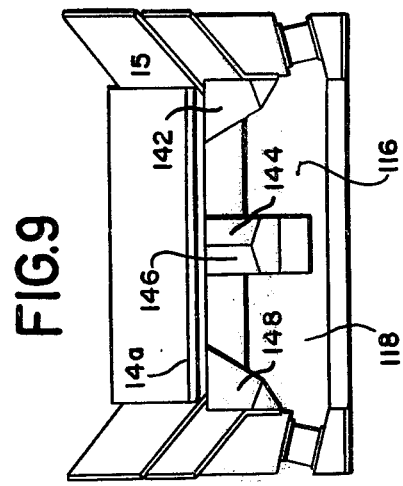

TABLE FEEDER

BACKGROUND OF THE INVENTION

This invention relates to a new and improved material handling apparatus and more specifically to a material handling apparatus having one or more support trays which move through forward and return strokes.

Heretofore support trays or tables have been used to convey ore by reciprocating the trays through forward and return strokes. The rate at which the ore is moved relative to the tray has been adjusted by varying the rate at which the support tray or table is moved through forward and return strokes. However, varying the stroke rate of the support tray or table can be relatively expensive and, in certain environments, rather difficult.

The ore may be dropped onto the support tray from trucks or supply bins for feeding to an ore crusher. In crushing it is generally desirable to avoid feeding to the crusher pieces of ore which are smaller than the output slit or opening of the crusher. This is because the small pieces of ore are not crushed and reduce the capacity of the crusher.

SUMMARY OF THE PRESENT INVENTION

The present invention provides a new and improved material handling apparatus which includes a reciprocable support tray having a surface for supporting ore or other materials. A drive assembly is provided for moving the support tray through forward and return strokes at a predetermined stroke rate. The length of the forward and return strokes can be adjusted while maintaining the stroke rate substantially constant and without interrupting the reciprocatory movement of the support tray. The drive assembly has a compact construction and is disposed beneath the support tray where the drive assembly is protected from damage by falling pieces of ore and other foreign objects. The compact construction of the drive assembly enables the material handling apparatus to have a relatively low overall height.

The length of the forward and return strokes is advantageously varied by varying the angular relationship of a central axis of a rotatable input member relative to the path of movement of the support tray. The input member can be connected with the support tray by a linkage. One end of the linkage is connected with the input member at a location offset from the central axis of the input member so that rotation of the input member moves the one end of the linkage along a circular path. By varying the angular relationship between the central axis of the input member and path of movement of the support tray, the circular path of movement of the one end of the linkage is tilted to a greater or lesser extent relative to the path of movement of the support tray. The greater the extent to which the circular path of movement of the end of the linkage is tilted or canted relative to the path of movement of the support tray, the greater is the stroke length through which the support tray is moved by rotation of the input member. The speed at which the input member is rotated remains constant as the angular relationship of the input member to the path of movement of the support tray is varied so that the stroke rate, that is the number of strokes per increment of time, remains constant even though the distance through which the support tray is moved on each stroke is varied.

A second tray may be provided to receive material from the first tray. This second tray is advantageously provided with openings to enable small pieces of ore to be screened out or segregated from the larger pieces of ore. To promote such a screening action, the second tray is moved through up and down strokes as it is being moved through forward and return strokes with the support tray. The second tray may be moved through the up and down strokes and the forward and return strokes by the same drive assembly as moves the support tray.

Accordingly, it is an object of this invention to provide a new and improved material handling apparatus having a support surface which is reciprocated through a forward and a return stroke at a predetermined stroke rate and wherein a stroke adjusting means is provided to vary the length of the forward and return strokes while maintaining the predetermined stroke rate substantially constant.

Another object of this invention is to provide a material handling apparatus in accordance with the next preceding object wherein a linkage is provided to transmit forces from an input member which is rotatable about its central axis to the support surface, the length of the forward and return strokes being varied by varying the angular relationship of the central axis of the input member relative to the path of movement of the support surface.

Another object of this invention is to provide a material handling apparatus which includes a first support surface which is reciprocated through forward and return strokes and a second support surface which is moved through the forward and return strokes with the first support surface and is also moved through up and down strokes extending transversely to the forward and return strokes.

BRIEF DESCRIPTION OF THE DRAWINGS

The foregoing and other objects and features of the present invention will become more apparent upon a consideration of the following description taken in connection with the accompanying drawings wherein:

FIG. 1 is an elevational view for a material handling apparatus constructed in accordance with the present invention and illustrating the relationship between a support tray and a drive assembly for reciprocating the support tray through forward and return strokes;

FIG. 2 is a plan view, taken generally along the line 2—2 of FIG. 1, further illustrating the construction of the drive assembly;

FIG. 3 is a sectional view, taken generally along the line 3—3 of FIG. 1, further illustrating the relationship of the drive assembly to the support tray;

FIG. 4 is an enlarged fragmentary sectional view illustrating the relationship between the support tray, the drive assembly, and a mechanism for adjusting the stroke through which the support tray is moved by the drive assembly;

FIG. 5 is a schematic illustration depicting the relationship between the drive assembly and support tray;

FIG. 8 is an enlarged sectional view, taken generally along the line 8—8 of FIG. 7 illustrating a screening tray drive assembly; and, FIG. 9 is an end view, taken generally along the line 9—9 of FIG. 8, illustrating the construction of an outlet end portion of the screening tray.

DESCRIPTION OF ONE SPECIFIC PREFERRED EMBODIMENT OF THE INVENTION

Figures 6, 7:
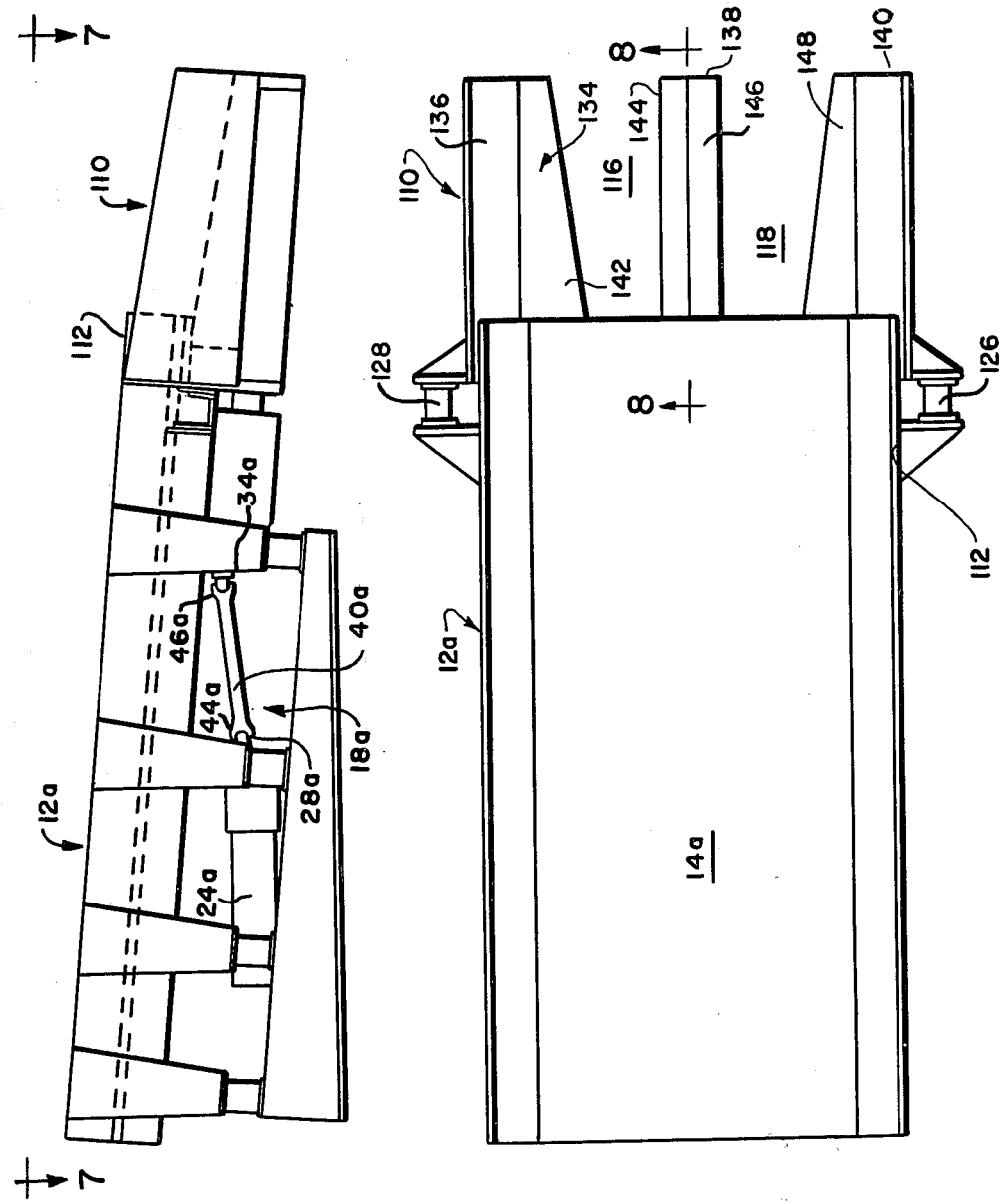
FIG. 6 is an elevational view, generally similar to FIG. 1, of a second embodiment of the invention in which a screening tray is associated with a support tray.
FIG. 7 is a plan view, taken generally along the line 7—7 of FIG. 6, further illustrating the relationship between the screening and support trays.

A material handling apparatus 10 constructed in accordance with the present invention is illustrated in FIG. 1 and includes a support table or tray 12 having a forwardly and downwardly sloping support surface 14 for receiving ore or other materials (not shown). An improved drive assembly 18 is operable to reciprocate the support tray 12 through forward and return strokes to advance the material on the support surface 14 in a forward direction, that is toward the right as viewed in FIG. 1. A stroke adjusting mechanism 20 (see FIGS. 2 and 4) is operable to vary the length of the stroke through which the drive assembly 18 moves the support tray without changing the stroke rate, that is the number of strokes through which the tray is reciprocated in a unit of time. Of course, varying the length of the strokes through which the tray is reciprocated varies the rate at which the material is advanced along the tray.

The drive assembly 18 includes an electric motor 24 which rotates an input or crank member 28 at a constant speed through a known coupling arrangement 30 (see FIG. 4). The rotatable input member 28 is connected with a rotatable drive member 34 by a linkage 36. A support block 38 is fixedly connected with the support tray 12 and holds the drive member 34 against axial or translational movement relative to the support tray while permitting the drive member to rotate about the central axis. The linkage 36 is of the conical pendulum type and includes a main rod or link 40 which is connected with the input member 28 by a cardan or universal joint 44. The other end of the link 40 is connected with the drive member by a second cardan or universal joint 46. The permanently lubricated universal joints 44 and 46 are capable of transmitting both axial and rotational movement so that the drive member is moved axially and rotated by the linkage 36. However, it should be understood that in the embodiment of the invention illustrated in FIGS. 1–5 the joints could, if desired, be constructed so as to be incapable of transmitting rotary movement.

Upon operation of the electric motor 24, the input member 28 is rotated about its central axis 50 (see FIG. 5) at a constant speed. The rotational movement of the input member 28 about its central axis 50 is converted to translational movement to reciprocate the drive member 34 and support tray 12. This is accomplished by the interaction between the drive member 28 and the linkage 36.

Upon rotation of the input member 28 about its central axis 50, an end portion 54 of the linkage 36 is moved along a circular path which is coincident with the central axis of the input member 28. The central axis 50 of the input member 28 is offset relative to the path of movement of the support tray 12 (see FIG. 5). Therefore upon rotation of the input member about the central axis 50, the end portion 54 of the linkage 40 moves from a lower position (shown in dashed lines in FIG. 5) in which it is spaced relatively far away from the path of movement of the support tray to a diametrally opposite upper position (shown in solid lines in FIG. 5) in which the end portion of the linkage 36 is relatively close to the path of movement of the tray. Therefore, as the end portion 54 of the linkage 36 moves from the position shown in dashed lines shown in FIG. 5 to the position shown in solid lines in FIG. 5 the drive member 34 and support tray 12 are moved through a forward stroke equal to the distance designated S in FIG. 5.

The support tray 12 is connected with a base 58 by a plurality of resilient mounting members 60. The mounting members 60 are advantageously formed by a plurality of rubber blocks. However, if desired, resiliently deflectable leaf springs could be utilized. As the support tray 12 is moved through a forward stroke the support blocks 60 are resiliently deflected. The resilient rubber support blocks 60 absorb shock or impact loads resulting from the dumping of ore onto the support tray 60.

During continued rotation of the input member 28, the end portion 54 of the linkage 36 continues to move along its circular path from the position shown in solid lines to a position shown in dashed lines in FIG. 5. As this occurs, a second end portion 64 of the linkage 36 moves rearwardly through a linear return stroke of a length equal to the length of the forward stroke. As this occurs, the tray 12 is moved rearwardly under the combined influence of the linkage 36 and the biasing force supplied to the tray by the resiliently deflected support blocks 60. Thus, during each completion of revolution of movement of the input member 28 about its central axis 50, the support tray 12 is moved through forward and return strokes under the combined influence of the linkage 36 and the support blocks 60. Of course, the linkage 36 could be constructed in such a manner as to enable the support tray 12 to be moved rearwardly under only the influence of the support blocks 60.

In accordance with a feature of the present invention, the length of the forward and return strokes through which the tray 12 is moved can be varied without changing the stroke rate of the support tray. Thus, the distance S in FIG. 5 can be either extended or contracted while maintaining a substantially constant number of complete forward and return strokes per second. This is accomplished without interrupting movement of the tray 12 by varying the angular relationship of the central axis 50 of the input member 28 relative to the path of movement of support tray 12.

In the schematic illustration of FIG. 5, the central axis of the input member 28 is parallel to the path of movement of the support tray. If the input member is rotated in a clockwise direction (as viewed in FIG. 5) about an axis extending perpendicular to the axis 50, the upper portion of the circular path of movement of the end portion 54 of the linkage 36 is moved toward the support tray 12 while the diametrally opposite lower portion (illustrated in dashed lines in FIG. 5) is moved away from the support tray. This results in an increase in the length of the stroke S. Similarly, if the stroke S is to be decreased, it is merely necessary to pivot the input member 28 in a generally counterclockwise direction (as viewed in FIG. 5). This results in the lower portion of the circular path of movement of the end of the linkage 36 being moved toward the support tray while the upper portion of the circular path of movement is moved away from the support tray.

When the central axis 50 of the input member 28 is coincident with an axis 72 of a right circular cone formed by the path of movement of the link 40, that is when the axis 50 is coincident with the axis 72 and the angle indicated at 74 is zero degrees, the input member 28 will be ineffective to drive the output member 34. However, as the angle 74 is increased, the stroke S through which the support tray 12 is increased.

The input member 28 is mounted on a rotatable support head or box 78 (see FIG. 4). Suitable thrust bearings 82 engage the input member 28 to hold it against axial movement while permitting it to be rotated about its central axis 50. The support box 78 is pivotally mounted on upstanding support posts 84 and 86 (see FIGS. 1–3). The pivot mountings between the support box 78 and posts 84 and 86 support the output member 28 for pivotal movement about an axis extending perpendicular to and intersecting the axis 50.

The stroke adjusting mechanism 20 is operable to pivot the support box 78 to thereby vary the angular relationship of the input member 28 to the path of movement of the support tray. The stroke adjusting mechanism 20 includes a tilt or actuator lever 90 (see FIGS. 2 and 4) which is fixedly connected to the support box 78. Upon operation of a stroke adjusting or tilt motor 94, the support box 78 is pivoted about an axis extending perpendicular to the central axis 50 of the input member 28 by the tilt lever 90. To this end, the tilt lever 90 is connected with the motor 94 by a screw 98 (FIG. 4) in a gear box 102 (FIG. 2) which is directly driven by the motor 94.

Upon operation of the motor 94, a suitable gear, which is in threaded engagement with the screw 98, moves the screw axially to pivot the support lever 90 in either a clockwise or counterclockwise direction as viewed in FIG. 4. It should be noted that this movement of the tilt lever 90 can be accomplished while the input member is being driven by the main motor 24. Since the main motor 24 is mounted on the support box 78 and moves with the support box, the driving and positional relationship between the motor 24 and input member 28 are maintained constant even though the input support box 78 is rotated to vary the angular relationship between the central axis 50 and the path of movement of the support tray 12.

In the embodiment of the invention illustrated in FIGS. 6–9, a screening tray is associated with a support tray having the same construction as the support tray 12 of FIGS. 1–5. Although the screening tray is moved back and forth through forward and return strokes with the support tray by a drive assembly having the same construction as the drive assembly 18 of FIGS. 1–5, the screening tray is also reciprocated up and down to promote the segregating of relatively small pieces of ore from relatively large pieces of ore which are to be crushed. In order to avoid prolixity of description, elements of the embodiment of the invention illustrated in FIGS. 6–9 will be designated with the same numerals as corresponding elements of the embodiment of the invention illustrated in FIGS. 1–5. However, the suffix letter "a" will be added to the numerals associated with FIGS. 6–9 in order to avoid confusion.

The embodiment of the invention illustrated in FIG. 6 a screening tray 110 is mounted on a forward or outlet end portion 112 of a support tray 12a. The support tray 12a is reciprocated back and forth through forward and return strokes by a drive assembly 18a. The screening tray 110 receives ore or other materials from the support tray 12a. The screening tray 110 is effective to screen out or segregate relatively small pieces of ore from relatively large pieces of ore which must be crushed. Accordingly, the screening tray is provided with a pair of longitudinally extending openings 116 and 118 (see FIG. 7) through which the small pieces of ore fall out.

To promote movement of the small pieces of ore through the openings 116 and 118, the screening tray 110 is moved back and forth with the support tray 12a by the drive assembly 18a. In addition the screening tray 110 is moved up and down by a screening tray drive assembly 122 (see FIG. 8). The screening tray is mounted on the outer end portion 112 of the support tray 12a by resiliently deflectable rubber support blocks 126 and 128 (see FIG. 7). The support blocks 126 and 128 are effective to move the screening tray 110 back and forth with the support tray 12a. The screening tray drive assembly 122 includes an eccentric shaft 130 which is rotated by the drive assembly 18a for the support tray 12a to move the screening tray 110 up and down along a generally circular path to thereby toss or raise the ore above a support surface 134 formed on longitudinally extending sections 136, 138, and 140 of the screening tray 110. The support surface 134 is made of of sloping sections 142, 144, 146, and 148 (see FIG. 9) which are disposed adjacent to side portions of the openings 116 and 118.

The eccentric drive shaft 130 is rotatably disposed in thrust bearings 154 and 156 which hold the shaft 130 against axial movement relative to a housing 158. A central axis of the shaft 130 extends parallel to the central axis of the drive member 34a. The housing 158 is fixedly connected with the screening tray 110.

The drive member 34a of the drive assembly 18a is provided with an output gear 160. The output gear 160 is disposed in meshing engagement with a gear 162 on a cylindrical end portion 164 of the drive shaft 130. This cylindrical end portion 164 is offset relative to a mounting or support section 168 of the drive shaft. Thus, the geometric center about which the end portion 164 of the shaft 130 is rotated is offset relative to the geometric center of the circular support portion 168. Therefore, when the end portion 164 of the shaft is rotated in bearings 172 and 174, the support section 168 is rotated about an axis which is offset from its geometric central axis so that the support tray 110 is moved up and down along a circular path by the drive shaft 130. It should be understood that a forward mounting portion 178 of the eccentric drive shaft 130 is coaxial with the mounting section 168 so that it is also disposed eccentrically of the central axis about which the end portion 164 of the shaft 130 is rotated by the gear 160. The drive shaft 130 is advantageously provided with a relatively large eccentric central portion 182 to enable the eccentric shaft 130 to function as a counterweight.

Upon operation of the drive assembly 18a, an input member 28a is rotated about its central axis at a constant speed by a motor 24a. The rotational movement of the input member 128a about its central axis is converted into translational movement to reciprocate and rotate a rod or link 40a. The rod or link 40a is connected with the drive member 34a and the input member 28a through suitable universal or cardon joints 44a and 46a which are capable of transmitting both axial and rotation movement from the input member 28a to the drive member 34a in the same manner as previously described in connection with the embodiment of the invention illustrated in FIGS. 1–5.

The axial movement of the drive member 34a causes the support tray 12a to reciprocate back and forth through forward and return strokes. This reciprocating movement of the support tray 12a is transmitted to the screening tray 110 and causes it to move back and forth through forward and return strokes. A stroke adjusting mechanism (not shown) is of the same construction as the stroke adjusting mechanism 20 and is operable to vary the length of the forward and return strokes through which the support and screening trays 12a and 110 are moved. Since the drive assembly 18a and associated stroke adjusting mechanism are constructed and cooperate in the same manner previously described in connection with the embodiment of the invention illustrated in FIGS. 1–5, varying the length of the forward and return strokes by operating the stroke adjusting mechanism does not vary the stroke rate.

While the support and screening trays 12a and 110 are being reciprocated through forward and return strokes, the screening tray drive assembly 122 is effective to move the screening tray 110 up and down to toss or raise the pieces of ore upwardly from the support surface 134 to promote an efficient screening action. In the specific preferred embodiment of the invention illustrated in FIG. 8 the screening tray drive assembly 122 is effective to move the screening tray up and down at a frequency which is three times as great as the frequency at which the screening tray 110 is moved through forward and return strokes. To this end, there is a three-to-one drive ratio between the gears 160 and 162. The input member 28a (see FIG. 6) is rotated by a constant speed motor 24a. Rotation of the input member 28a rotates the link 40a and drive member 34a through one revolution each time the support tray 12a is moved through a forward and return stroke. Therefore, the shaft 130 is rotated through three revolutions by the gear 160 each time the support tray 12a is moved through a forward and return stroke. For each revolution of the shaft 130, the screening tray 110 is moved through an up and down stroke. Therefore, the frequency of up and down vibration of the screening tray 110 will be three times as great as the frequency of forward and backward vibration and screening trays 12a and 110.

In the embodiment of the invention illustrated in FIGS. 6–9, the drive member 34a is connected directly with the link 40a by the universal joint 46a. However, it is contemplated that the screening tray 110 could be connected in a different manner with the linkage 36a. For example, a drive member could be mounted on the support tray 12a in the same manner as in which the drive member 34 is mounted on the support tray 12 in FIG. 4. The drive member 34a of FIG. 8 could then be connected with the forward end of the drive member 34 of FIG. 4 by a suitable spline connection. In addition, if the screening tray 12a is to be reciprocated through up and down strokes at the same speed as which it is moved through forward and return strokes, the drive member 34a could be integrally formed with the eccentric shaft 130 of the screening tray drive assembly 122.

In view of the foregoing description, it can be seen that the material handling apparatus 10 includes a reciprocable support tray 12 having a surface 14 which supports ore or other materials. Upon operation of a drive assembly 18, the support tray 12 is reciprocated back and forth through forward and return strokes at a predetermined stroke rate. The length of the forward and return strokes can be adjusted by operating the stroke adjusting mechanism 20 while maintaining a substantially constant stroke rate.

The length of the forward and return strokes is varied by changing the angular relationship of a central axis 50 of the input member 28 relative to the path of movement of the support tray. The input member 28 is connected with the support tray by a linkage 36. One end 54 of the linkage 36 is connected with the input member at a location offset from the central axis 50 of the input member 28. Rotation of the input member 28 about its central axis moves the one end 54 of the linkage 36 along a circular path. Operation of the motor 94 in the stroke adjusting mechanism 20 pivots the input member 28 about an axis extending perpendicular to the axis 50. This pivoting movement varies the angular relationship between the central axis 50 of the input member 28 and the path of movement of the support tray 12. This causes the circular path of movement of one end 54 of the linkage 36 to be moved toward the support tray 12 while the diametrally opposite portion of the circular path is moved away from the support tray. When the operating stroke S of the support tray 12 is to be increased, the angle 74 is increased and the upper portion of the circular path is moved toward the support tray while the diametrally opposite lower portion of the circular path is moved away from the support tray. Similarly, decreasing the angle 74 moves the upper portion of the circular support path away from the support tray and moves the diametrally opposite lower portion of the circular path toward the support tray. This decreases the operating stroke.

In the embodiment of the invention illustrated in FIGS. 6–9 a screening tray 110 is connected with the support tray 12a. The screening tray 110 is moved up and down by a screening tray drive assembly 122. The screening tray drive assembly 122 forms an extension of the drive assembly 18a for the support tray 12a. This enables a common drive motor 24a to be utilized to drive support tray 12a through forward and return strokes and to move the screening tray 110 through up and down strokes. It should be noted that the length and frequency of the up and down strokes of the screening tray 110 are both maintained constant even though the stroke adjusting mechanism is operated to vary the length of the forward and return strokes through which the support tray 12a and screening tray 110 are moved. This is because the input member 28a is rotated at the same speed by the motor 24a regardless of the length of the stroke of the support tray 12a.

Having described a specific preferred embodiment of the invention, the following is claimed:

1. An apparatus comprising first reciprocatable material support means having a first support surface for supporting material, means for reciprocating said first support surface through forward and return strokes to move any material disposed on said first support surface, second reciprocatable material support means having a second support surface for receiving material from said first material support means, means for effecting movement of said second support surface through forward and return strokes with said first support surface and means for reciprocating said second support surface through up and down strokes extending transversely to said forward and return strokes at a rate which is a direct function of the rate of movement of said first support surface through forward and return strokes.

2. An apparatus as set forth in claim 1 further including stroke adjusting means for varying the length of said forward and return strokes while maintaining the length of said up and down strokes substantially constant.

3. An apparatus as set forth in claim 1 wherein said means for reciprocating said first support surface includes means for reciprocating said first support surface at a predetermined stroke rate, said apparatus further including stroke adjusting means for varying the length of said forward and return strokes while maintaining said predetermined stroke rate substantially constant.

4. An apparatus as set forth in claim 3 wherein said stroke adjusting means is operable to vary the length of said forward and return strokes while maintaining the length of said up and down strokes substantially constant.

5. An apparatus as set forth in claim 4 wherein said means for moving said first support surface through forward and return strokes includes a drive member connected with said first support surface, an input member rotatable about a central axis, linkage means for connecting said input member with said drive member, said stroke adjusting means including means for varying the angular relationship of the central axis of said input member relative to the path of movement of said first support surface through said forward and return strokes to vary the length of said forward and return strokes.

6. An apparatus as set forth in claim 1 wherein said second support surface includes means for defining a plurality of openings through which pieces of material of a size less than a predetermined size may pass.

7. An apparatus as set forth in claim 1 wherein said means for reciprocating said second support surface through up and down strokes is effective to move said second support surface at a rate which is greater than the rate at which said first support surface is moved through forward and return strokes.

8. An apparatus comprising first reciprocatable material support means having a first support surface for supporting material, means for reciprocating said first support surface through forward and return strokes to move any material disposed on said first support surface, said means for reciprocating said first support surface through forward and return strokes includes a first drive member connected with said first support surface, means for enabling said first drive member to rotate relative to said first support surface and for preventing translational movement of said first drive member relative to said first support surface, and drive means for rotating said first drive member and simultaneously therewith moving said first drive member through forward and return strokes, second reciprocatable material support means having a second support surface for receiving material from said first material support means, means for effecting movement of said second support surface through forward and return strokes with said first support surface and means for reciprocating said second support surface through up and down strokes extending transversely to said forward and return strokes, said means for reciprocating said second support surface through up and down strokes including means connected with said first drive member and said second support surface for moving said second support surface up and down relative to said first support surface under the influence of rotational forces transmitted from said drive means to said first drive member.

9. An apparatus as set forth in claim 8 wherein said means for reciprocating said first support surface includes means for reciprocating said first support surface at a predetermined stroke rate, said apparatus further including stroke adjusting means for varying the length of said forward and return strokes while maintaining said predetermined stroke rate substantially constant.

10. An apparatus as set forth in claim 9 wherein said stroke adjusting means is operable to vary the length of said forward and return strokes while maintaining the length of said up and down strokes substantially constant.

11. An apparatus as set forth in claim 10 wherein said means for moving said first support surface through forward and return strokes includes a drive member connected with said first support surface, an input member rotatable about a central axis, linkage means for connecting said input member with said drive member, said stroke adjustment means including means for varying the angular relationship of the central axis of said input member relative to the path of movement of said first support surface through said forward and return strokes to vary the length of said forward and return strokes.

12. An apparatus comprising first reciprocatable material support means having a first support surface for supporting material, means for reciprocating said first support surface through forward and return strokes to move any material disposed on said first support surface, said means for reciprocating said first support surface through forward and return strokes includes a first drive member connected with said first support surface, means for enabling said first drive member to rotate relative to said first support surface and for preventing translational movement of said first drive member relative to said first support surface, and drive means for rotating said first drive member and simultaneously therewith moving said first drive member through forward and return strokes, second reciprocatable material support means having a second support surface for receiving material from said first material support means, means for effecting movement of said second support surface through forward and return strokes with said first support surface and means for reciprocating said second support surface through up and down strokes extending transversely to said forward and return strokes, said means for reciprocating said second support surface through up and down strokes including means connected with said first drive member and said second support surface for moving said second support surface up and down relative to said first support surface under the influence of rotational forces transmitted from said drive means to said first drive member, said last mentioned means including a second drive member connected with said first drive member and means for rotating said second drive member at a speed which varies as a function of variations in the speed of rotation of said first drive member.

13. An apparatus comprising first reciprocable material support means having a first support surface for supporting material, means for reciprocating said first support surface through forward and return strokes to move any material disposed on said first support surface, said means for reciprocating said first support surface through forward and return strokes includes a first drive member connected with said first support surface, means for enabling said first drive member to rotate relative to said first support surface and for preventing translational movement of said first drive member relative to said first support surface, and drive means for rotating said first drive member and simultaneously therewith moving said first drive member through forward and return strokes, second reciprocatable material support means having a second support surface for receiving material from said first material support means, means for effecting movement of said second support surface through forward and return strokes with said first support surface and means for reciprocating said second support surface through up and down strokes extending transversely to said forward and return strokes, and means for reciprocating said second support surface through up and down strokes including means connected with said first drive member and said second support surface for moving said second support surface up and down relative to said first support surface under the influence of rotational forces transmitted from said drive means to said first drive member, said last mentioned means including a second drive member connected with said first drive member and means for rotating said second drive member at a speed which varies as a function of variations in the speed of rotation of said first drive member, said means for rotating said second drive member including gear means connected with said first and second drive members for effecting rotation of said second drive member at a speed which is different than the speed of rotation of said first drive member.

14. An apparatus comprising a first support surface, means for supporting said first support surface for movement through forward and return strokes to move any material disposed on said first support surface, a second support surface, means for connecting said second support surface with said first support surface to effect movement of said second support surface through forward and return strokes with said first support surface and for enabling said second support surface to move relative to said first support surface through up and down strokes contemporaneously with movement of said second support surface through forward and return strokes, and drive means for effecting contemporaneous movement of said first and second support surfaces through forward and return strokes and for simultaneously therewith effecting movement of said second support surface relative to said first support surface through up and down strokes.

15. An apparatus as set forth in claim 14 further including stroke adjusting means for varying the length of said forward and return strokes of said first and second support surfaces while maintaining the length of said up and down strokes of said second surface substantially constant.

16. An apparatus as set forth in claim 14 wherein said drive means includes a single motor and a drive member which is moved axially under the influence of said single motor to effect movement of said first and second support surfaces through forward and return strokes and which is rotated under the influence of said single motor to effect movement of said second support surface through up and down strokes.

17. An apparatus as set forth in claim 14 wherein said drive means includes a single member which is effective to transmit forces to effect movement of said first and second support surfaces through said forward and return strokes and to transmit forces to effect movement of said second support surface through up and down strokes.

18. An apparatus as set forth in claim 14 wherein said drive means includes an axially movable and rotatable drive member connected with one of said support surfaces, an input member rotatable about a central axis, and linkage means for connecting said input member with said drive member, said apparatus further including stroke adjusting means for varying the angular relationship of the central axis of said input member relative to said drive member to vary the length of at least one of the strokes through which said second support surface is moved.

* * * * *